April 26, 1960   A. J. BACHELDER ET AL   2,933,993
PHOTOGRAPHIC APPARATUS

Original Filed July 10, 1956   4 Sheets-Sheet 1

Albert J. Bachelder
and
Vaito K. Eloranta
INVENTORS

BY Brown and Mikulka

ATTORNEYS

INVENTORS
Albert J. Bachelder
Vaito K. Eloranta
BY
Brown and Mikulka
ATTORNEYS

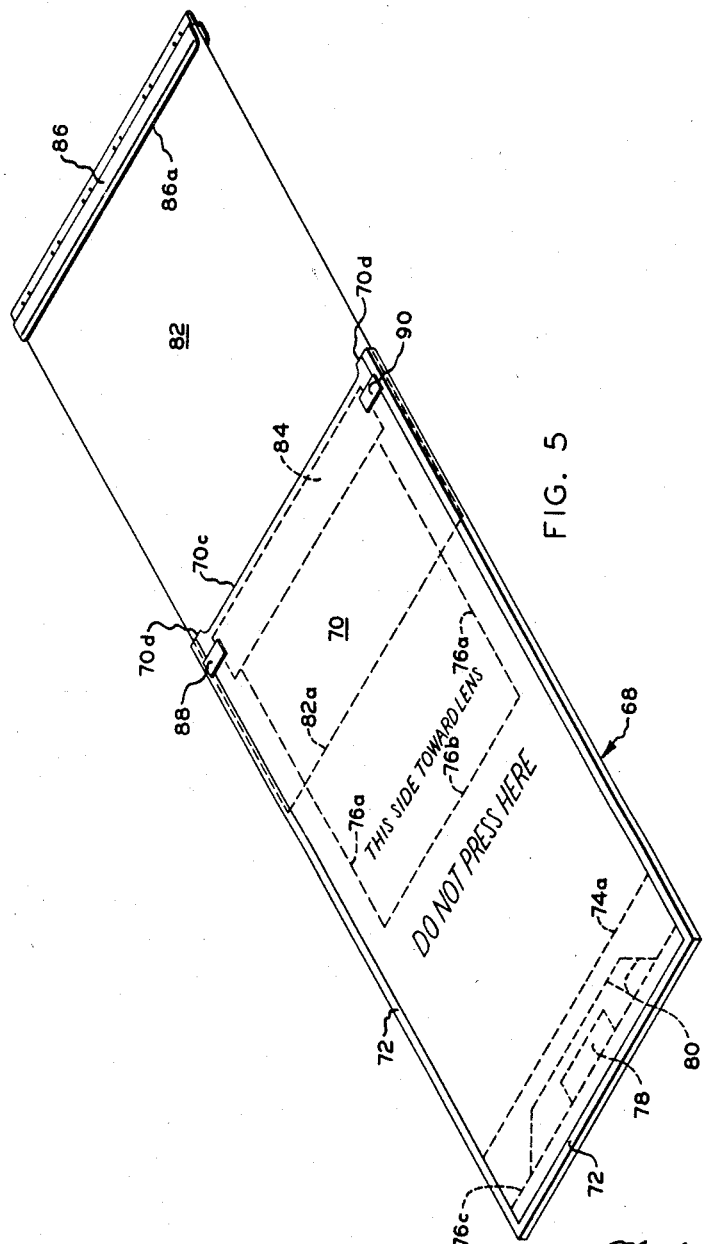

United States Patent Office 2,933,993
Patented Apr. 26, 1960

2,933,993

PHOTOGRAPHIC APPARATUS

Albert J. Bachelder, Lexington, and Vaito K. Eloranta, Needham, Mass., assignors to Polaroid Corporation, Cambridge, Mass., a corporation of Delaware Original application July 10, 1956, Serial No. 596,923. Divided and this application December 15, 1958, Serial No. 780,507

12 Claims. (Cl. 95—13)

The present invention relates to apparatus for photographically exposing and processing image-forming materials and more particularly to apparatus of the character described which is suitable for incoporation with image-forming and photographic exposure means of a camera.

An object of the present invention is to provide improved apparatus for photographically exposing and processing photographic materials identified with components of said apparatus to form a positive image of the subject of the photographic exposure, utilizing a process known in the art as "diffusion-transfer reversal." The apparatus may be said to be in part identified with a composite structure composed of relatively movable and alterable sheet-like and other components and in part with positioning and pressure-applying means external of, but adapted to cooperate with, the composite structure.

Another object is to provide apparatus for photographically exposing and processing photographic materials of a composite assembly of the foregoing type in the form of an adapter or attachment which can conveniently be mounted on a camera such as a 4 x 5 "press camera," without requiring any alteration of the camera.

A further object is to provide an improved assembly of sheet and processing materials for use with the aforesaid adapter apparatus which can be loaded in the adapter in daylight and which permits facility both in the photographic exposure of a photosensitive layer or surface of the assembly and in the processing of said layer and another layer of the assembly to provide a positive image of the subject of the exposure.

Still another object is to provide adapter apparatus of the foregoing type in which an assembly of relatively movable sheet materials, processing fluid and a closure therefor can easily and safely be inserted or removed in daylight; which permits movement and positioning of parts of the assembly to allow photographic exposure of a photosensitive surface; which cooperates with structural parts of the assembly to provide processing of image-forming elements of the photosensitive surface in such a manner as to ensure a positive print of satisfactory quality formed on another surface of the assembly and which permits or provides all of these operations and results in a consistent and efficient manner.

These and other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

Fig. 5 is a perspective view of the assembly of Fig. 2 showing an enclosing envelope element of the structure withdrawn from the photosensitive surface, thus placing the latter in readiness for a photographic exposure.

The present invention involves apparatus comprising a composite structure having fixed and movable sheet-like and enclosing parts and cooperating mechanism for performing or permitting various physical operations with respect thereto, said operations relating to photographic exposure of a photosensitive surface or layer to actinic radiation and to a subsequent photographic transfer process. The photographic transfer process involves the controlled progressive application of mechanical stress to the composite structure to effect the release and spreading of a liquid reagent between the photographically exposed photosensitive surface and a print-carrying surface, the surfaces being formed on sheet-like components of the unit and assembled in face-to-face relation. The transfer process may, in one form thereof, be said to be performed through permeation of the photographically exposed photosensitive surface and the development of a latent image formed in the emulsion thereof by a photographic developer and by a fixer for silver halide comprised by the liquid reagent; by removing undeveloped silver halide from the emulsion in the form of a soluble complex and by transporting it from the emulsion to the print-carrying layer so as to form a positive image in the latter. Examples of photographic materials suitable for use in a photographic process of a type contemplated herein or of related processes are set forth in detail in Patents Nos. 2,543,181, 2,559,643, 2,614,926, 2,647,049 and 2,647,056, all issued to Edwin H. Land.

More particularly, the invention is related to apparatus for performing certain physical steps which make possible the accomplishment of the foregoing types of photographic transfer processes and the provision of such apparatus in a form which is suitable for attachment to or incorporation with a camera, such as a "press camera." This form of camera is exemplified by the "Speed Graphic" camera manufactured by the Graflex Company of Rochester, New York. A special type of mechanical assembly of sheet-like and processing components and of complementary mechanism is required for adapting the photographic transfer process, hereinbefore described, to a press camera and it is with such an assembly of components and mechanism that the present invention is primarily concerned.

Figure 1:
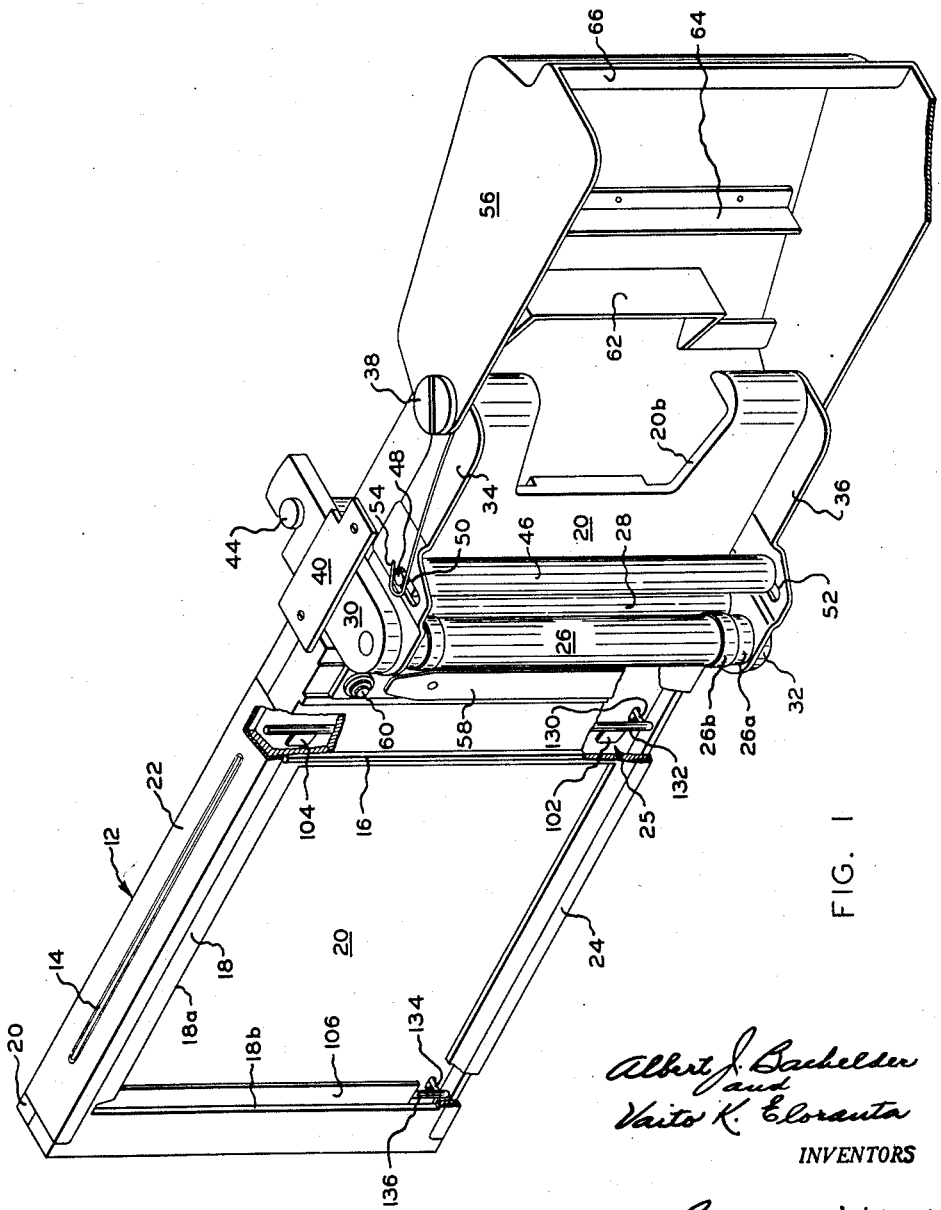
Figure 1 is a perspective view, with parts broken away, of positioning and processing mechanism of the apparatus.

In Fig. 1, adapter apparatus 12 suitable for incorporation with or attachment to a camera such as a "press camera" (not shown) is illustrated. The adapter easily slides into the standard channel provided at the rear of the camera which is normally used for receiving the camera back, said channel lying adjacent the focal plane of the camera lens system. The adapter can serve either in place of the camera back or it can readily be inserted between the camera back and the camera body, a light-tight seal being effected between the adapter and the camera elements in either instance. Grooves 14, extending along both sides of the adapter, are provided for engagement by retaining elements of the camera. Rib element 16 serves as a limit stop for ensuring correct position of the adapter in the camera channel and as a light-shielding element. The view of Figure 1 illustrates the front side of the adapter, namely, the side which, when mounted in the camera, faces the light of a photographic exposure entering through the camera lens. The assembly includes a front plate 18 and a rear plate 20 held together by a suitable fastening means such as longitudinally extending spring clips 22 and 24 which permit rapid joining of the plates in assembled relation. Front plate 18 has a cut-out area formed therein which is employed for positioning and framing a photosensitive element of the composite sheet-like structure during its photographic exposure. The marginal areas and other areas of plate 18 which overlie areas of plate 20 are spaced therefrom by portions of the plate structure to provide, between said areas, a semi-enclosed chamber having an entrance port or aperture 25, said chamber and port enabling slidable movement therebetween of the composite sheet-like structure shown in Fig. 2. Plate 20 serves as the principal supporting plate for the mechanisms of the adapter apparatus.

Further referring to Fig. 1, other elements of the apparatus which are illustrated relate to photographic exposure and processing of components of the composite sheet-like assembly. A pair of pressure rollers 26 and 28, preferably formed of a non-corrosive metal such as stainless steel, are employed for processing purposes. Roller 26 is mounted for rotation in a pair of supports or carriers 30 and 32 which are rigidly attached to pivotal arms 34 and 36. Arms 34 and 36 are pivotally fastened to plate 20 by screws or bearing means 38 (one only shown), thus allowing bodily movement of carriers 30 and 32 and permitting roller 26 to be moved bodily toward and away from roller 28. Roller 28 is mounted for rotation in bearing means provided at each end of a transversely-extending, semi-enclosed recess 20a formed in plate 20. A pair of plates 40 (one only shown) permits the aforesaid movement of carriers 30 and 32 to occur freely but prevents their undesired movement in a lateral direction and also serves as a guard or shield to protect the roller-mounting elements. When the rollers are being used for compressing the longitudinally moving composite sheet-like assembly for processing purposes, roller 26 is biased toward roller 28 by a flat spring 42 which bears, respectively, against the underside of reserved portion 20a of rear plate 20 and a rod 44, the spring 42 and rod 44 being shown more clearly in Fig. 4. The aforesaid pivotal mounting of the supports or carriers 30 and 32 for roller 26 avoids any binding of the moving and fixed parts or undesirable friction which might occur if, for example, the carriers were mounted for slidable movement in a direction angularly disposed with respect to the longitudinal direction in which the film unit is drawn between the rollers. When the composite sheet-like assembly is to be inserted in the apparatus of adapter 12, roller 26 is moved away from roller 28 by separating means to be described below, and the rollers are held in spaced relation, thus permitting insertion of the composite sheet-like assembly between the rollers. When the composite assembly of Fig. 2 and adapter 12 are employed together, roller 26 is moved away from roller 28 by separating means to be described below, and the rollers are held in spaced relation, thus permitting insertion of the composite assembly between the rollers. Loading of the assembly will be explained in connection with a description thereof, which follows.

Light-shielding means, for preventing entrance of unwanted actinic light to a photosensitive surface identified with one of the sheet-like components is preferably located adjacent the "bite" of the pressure rollers. A suitable light-shielding device comprises a soft rubber roll 46 having its axle 48 mounted for both rotation and bodily movement in slots 50 and 52 formed, respectively, in pivotal arms 34 and 36. Light-shielding roll 46 is biased at its extremities toward plate 20 by wire springs 54 (one only shown). When the composite assembly has been loaded in adapter 12, a protective light-shielding housing or cover 56, pivotally attached to plate 20 by bearing means 38, serves to enclose pressure rollers 26 and 28 and light-shielding roll 46. Cover 56 is shown at the open position which permits access to the pressure rollers. A slidable latch 58, actuated by a knob 60, holds cover 56 at closed position. Flanged portions 62, 64 and 66 of the cover provide additional light-shielding means when the cover is closed.

Figure 2:
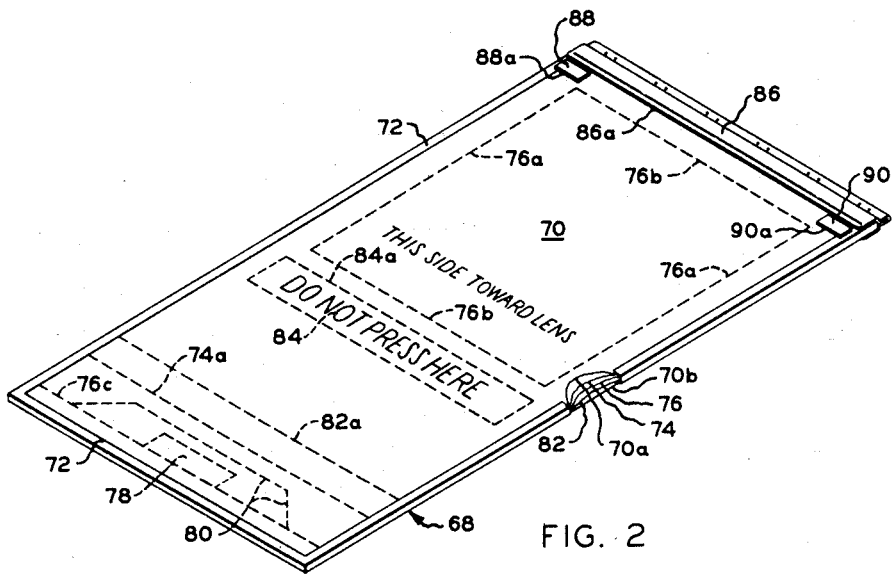
Fig. 2 is a perspective view, with parts broken away, of the composite assembly consisting of an envelope and contained sheet-like and fluid container components.

The composite assembly 68 is illustrated in Fig. 2 as it would appear ready for functional association with the adapter apparatus of Fig. 1. The assembly is shown in section in Fig. 3. The unit 68 comprises a plurality of sheet-like and other elements in generally superposed relation. The outermost of these elements is in enclosing envelope 70 formed, for example, of an opaque paper stock which is folded or sealed against the entrance of actinic light along three of its sides or edges, the construction shown consisting of individual front and rear walls 70a and 70b, sealed along adjacent sides by binding means 72. It will be noted that marginal portions 26a of pressure roller 26 are of reduced diameter and are thus prevented from bearing against the binding means 72. The fourth or front side of the envelope 70c shown in Fig. 5, namely, that side which is first introduced in the adapter of Fig. 1 during loading, is unsealed to permit withdrawal or reinsertion of the components which it contains, as will be described below.

Next in order, underlying the front wall 70a of envelope 70 is the print-carrying layer or sheet 74, hereinbefore mentioned with respect to the photographic transfer process. Sheet 74 is formed of a paper or other material, as, for example a baryta coated paper, having a surface suitably prepared for receiving the aforementioned soluble complex and adapted to undergo such modification as may be necessary to the formation of a positive image thereon. Print-carrying sheet 74 has a width slightly less than that of the envelope so that it can be slidably removed therefrom. The rear limit of sheet 74 is defined by the line 74a.

A masking sheet 76 is releasably bonded to the underlying, image-receiving surface of the print-carrying sheet 74. A cut-out area of the masking sheet lying within longitudinal marginal areas 76a and transverse marginal areas 76b is employed to define the picture area of print-carrying sheet 74 which will ultimately be employed for bearing the completed positive image. Masking sheet 76 extends rearwardly slightly beyond the limit 74a of print-carrying sheet 74 to the line 76c. Sheet 76 is attached to the front wall 70a of the envelope by a small area of an adhesive substance 78. Linear perforations 80 formed in the area of sheet 76 adjacent adhesive area 78 are adapted to be torn apart so as to permit sheet 76 to be separated from the wall 70a of the envelope, thus enabling the print-carrying sheet 74 to be freely withdrawn from the envelope after the positive image is formed.

A sheet 82, bearing a photosensitive emulsion and having a width which is slightly less than that of the envelope to permit its relative slidable movement therewithin, is located immediately behind masking sheet 76. The rear edge of the sheet is indicated by broken line 82a. Sheet 82, hereinafter called the photosensitive sheet, may be composed of any suitable material as, for example, a film of cellulose acetate or a paper having a photosensitive emulsion comprising a silver halide formed thereon.

Figure 3:
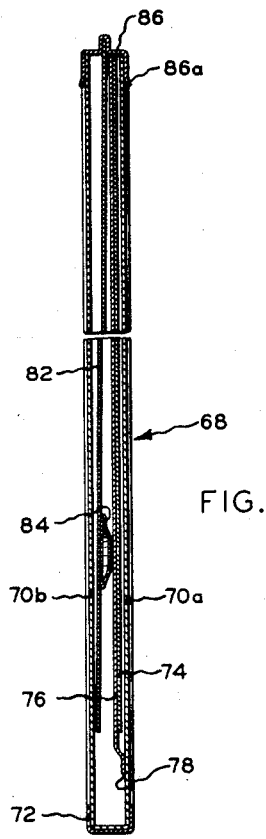
Fig. 3 is a sectional view of the assembly of Fig. 2.

An elongated liquid-carrying container or envelope 84 encloses a given supply of processing fluid constituting the liquid reagent hereinbefore mentioned in describing the photographic transfer process. The walls of container 84 are preferably of a multilayer construction, formed of vapor- and liquid-impervious materials comprising, for example, a paper and a metal foil. The container is fastened to the emulsion side of sheet 82 by suitable adhesive means. It is so positioned on sheet 82 that a pair of its superposed marginal areas 84a, which are releasably bonded together so as to separate when subjected to a given mechanical stress, are located adjacent edge 76a of the masking sheet 76 and, accordingly, adjacent image areas of the photosensitive and print-carrying sheets. A multipurpose clip 86 preferably formed of a material such as steel or a plastic is permanently fastened as, for example, by crimping, to that edge of photosensitive sheet 82 which is adjacent to the unsealed edges 70c of the envelope. As shown in Figs. 2 and 3, clip 86 constitutes a closure for envelope 70, thus preventing an unwanted entrance of actinic light to the photosensitive area contained within the envelope, by compressing the open edges 70c and 70d of the envelope together and by providing a light shield around the area adjacent to said edges. Its additional functions, as well as those performed by raised strips or platforms 88 and 90, will be described hereinafter relative to photographic exposure and processing operations. Flared edges 86a of the clip extend inwardly of the envelope edges 70c and provide a margin of safety with respect to light-sealing requirements.

Figure 4:
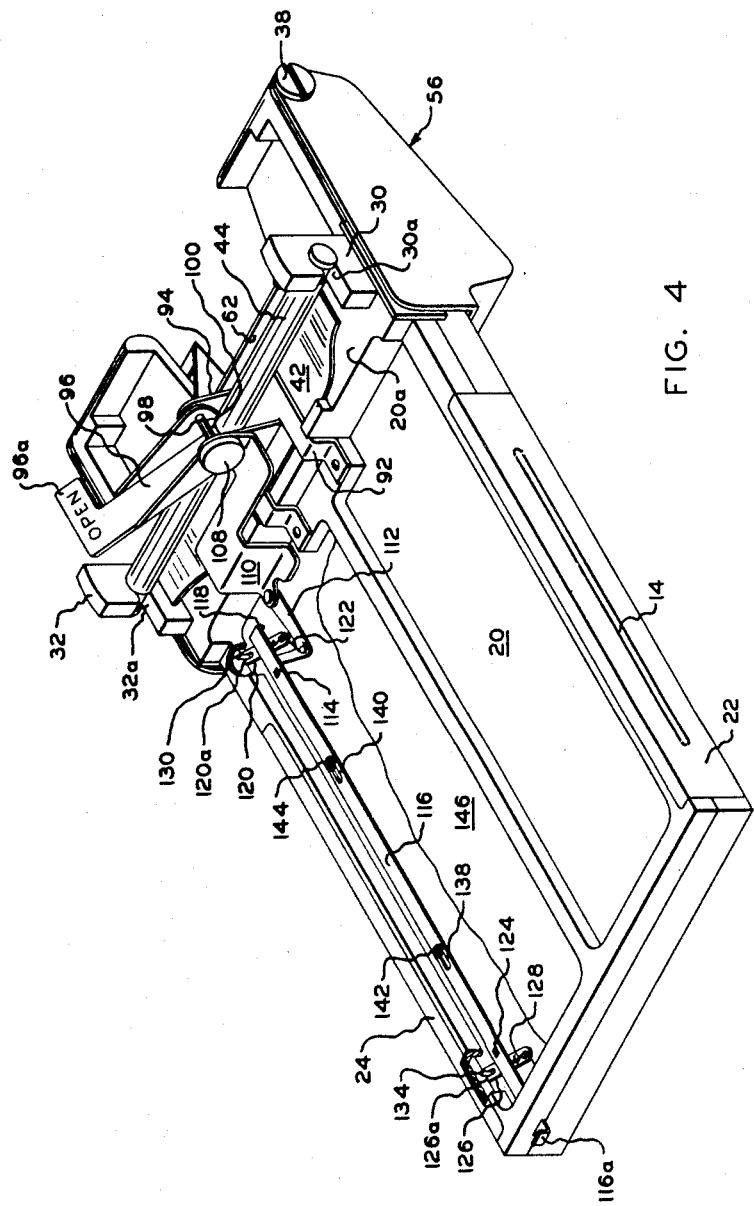
Fig. 4 is a perspective view, with parts broken away, of elements of the apparatus shown from a side which is opposite to that of Fig. 1.

In loading the composite assembly as shown in Fig. 2 in the adapter apparatus of Fig. 1, cover 56 of the adapter is swung to the closed position shown in Fig. 4 and the film unit is inserted through the slot provided at the rear of the cover. It is first necessary to space the rollers 26 and 28 of the adapter sufficiently apart to permit unobstructed insertion of the composite assembly through the entrance port 25 which leads to the semi-enclosed chamber provided between plate 20 and marginal framing areas of plate 18. This is effected by mechanism of the adapter shown in Fig. 4. A bracket 92, rigidly attached to rear plate 20, is formed so as to bridge the flat spring 42 and the rod 44. Rod 44 is releasably mounted for disassembly purposes in slots 30a and 32a. A yoke 94 is rigidly attached to bracket 92. A toggle type lever mechanism 96 comprises a handle portion 96a and an integral shaft 98, the latter being mounted for rotation in bearing surfaces of yoke 94. An offset, roller-type bearing 100 is mounted on the lower extremity of lever 96. Whenever the lever is actuated, bearing 100 is moved eccentrically toward or away from rod 44 depending on the direction in which the lever is turned, causing the rod to move either against or with the direction of force exerted by the spring 42, and, accordingly, causing pressure roller 26 to move away from or toward roller 28. When lever 96 is rotated to its limit in a counterclockwise direction, as viewed in Fig. 4, it places the adapter apparatus in readiness both for loading the composite sheet material assembly and for subsequent photographic exposure of the photosensitive surface. This position of lever 96 causes bearing element 100 to force rod 44 downwardly against the bias of spring 42. Roller 26 is thereby forced away from roller 28 sufficiently to permit free passage of the composite assembly 68 between the rollers during the loading operation. The composite assembly of Fig. 2 is loaded in a direction from right-to-left of the apparatus as viewed in Fig. 1, with clip 86 foremost and with the side carrying the inscription "the side toward lens" nearest to the camera lens, namely, toward the viewer. During the loading operation the composite assembly is inserted under spring-biased roller 46, between spaced rollers 26 and 28, through the chamber entrance aperture 25 and between the spaced marginal areas of plates 18 and 20 forming the exposure chamber, to the limit permitted by the chamber extremity 18b. When the assembly is thus loaded in the adapter apparatus, the area of the photosensitive sheet 82, delineated by the cut-out areas 76a and 76b of masking sheet 76, will be approximately centered on the cut-out area 18a of adapter plate 18. During the loading operation, the clip and envelope surface of the composite assembly is permitted to slide easily in back of spring-loaded detent vanes 102 and 104, and detent blade 106. The detent blade 106 engages the flared edge 86a of clip 86 and serves to hold the clip and the attached photosensitive sheet 82 in the exposure chamber while envelope 70 is being withdrawn to permit the photographic exposure. Detent vanes 102 and 104 engage edges 88a and 90a of the strips or platforms 88 and 90 when the envelope 70 has been withdrawn to a distance which uncovers photosensitive sheet 82 sufficiently to permit the photographic exposure.

When lever 96 is rotated in a clockwise direction, as viewed in Fig. 4, bearing element 100 no longer exerts pressure on the central portion of rod 44 and the rod is allowed to move upwardly under compulsion of spring 42. The underlying central area of spring 42 bears against the contoured area 20a of plate 20. The extremities of the spring bear against rod 44, biasing the rod in a direction away from plate area 20a. When rod 44 is thus released by bearing element 100 and is caused to move in the direction provided by spring 42, it carries supports 30 and 32 with it in a similar direction, thus drawing pressure roller 26 toward pressure roller 28 so as to apply a given compressive force to the composite sheet-like assembly when positioned in the adapter apparatus.

Assuming the composite sheet-like assembly and adapter components of the apparatus to be incorporated with a camera, with the side of the adapter shown in Fig. 1 facing the camera lens and with lever 96 at the position which spaces the pressure rollers 26 and 28 apart and places the detent means 102, 104 and 106 at positions for engaging their functionally related components, as above described, the apparatus is in readiness for performing the steps leading to the photographic exposure. The envelope 70 is grasped adjacent area 78 thereof, as permitted by the cut-out area 20b of plate 20, and is withdrawn to the limit determined by engagement of the normally disposed strip edges 88a and 90a with detent vanes 102 and 104, as above described, thus uncovering photosensitive sheet 82. The assembly, as it would be arranged when ready for the photographic exposure, is shown in Fig. 5. After completing the photographic exposure as, for example, by lens and shutter means, not shown, the envelope is returned inwardly of the adapter chamber to the extremity 18b of the chamber and the assembly resumes the appearance of Fig. 2. To facilitate this operation, protruding extremities 70d and recessed intermediate portions 70c of the envelope are provided to ensure entrance of the unsealed envelope edges into the flared edges 86a of the clip 86, the flared edges also contributing to this operation and the clip being held against movement between blade 106 and the end of the chamber during return of the envelope. Extremities 70d can be inserted to the full depth of clip 86, the latter serving to fasten the ends of the envelope tightly together and providing an effective seal against entrance of actinic light into the envelope, should it be desired, for any reason, to remove the assembly from the adapter before the processing operation. Removal of the assembly from the adapter after exposure but without processing will be described following a description of the processing operation.

After photographic exposure and return of the envelope to its position enclosing the exposed surface area, as above described, the assembly of sheet components, processing fluid and envelope is ready for the processing operation. Lever 96 is rotated as far as it will go in a clockwise direction, as viewed in Fig. 4. This removes bearing 100 from contact with rod 44 and permits pressure roller 26 to be biased toward pressure roller 28 under compressive force applied by spring 42. The pressure rollers are thus caused to engage the assembly beneath the inscription "do not press here," as viewed in Fig. 2, namely, just to one side of container 84.

Coincidental with the positioning of the rollers for the application of compressive force to the composite assembly, detent vanes 102 and 104 and detent blade 106 are automatically raised from positions, previously described, which caused them to contact strips 88 and 90 and clip 86, respectively, of the assembly. When the detents are thus removed from their contacting positions, the film unit can be fully advanced between the rollers. Mechanism for actuating the aforesaid detents is shown in Fig. 4 and comprises elements actuated by lever assembly 96 and integral shaft 98. An offset bearing means 108, fixedly mounted on the end of shaft 98, is caused to describe an eccentric movement when the lever and shaft are rotated, thus causing lateral movement of an interlocking link element 110. When lever 96 is rotated in a clockwise direction, as viewed in Fig. 4, thus positioning the pressure rollers for their compressive function, link 110 moves in a direction to the left, causing bell crank 112 to rotate in a counterclockwise direction. The bell crank engages a projection 114 extending downwardly from bar 116, driving the bar to the left. Bar 116 has a second downwardly extending projection 118 which, during its movement to the left, engages a lever 120 and causes the latter to pivot in a counterclockwise direction against the bias applied by a wire spring 122. Bar 116 has a third downwardly extending projection 124 which, during said movement to the left, engages a lever 126 and causes the latter to pivot in a counterclockwise direction against the bias applied by a wire spring 128. Lever 120 has a yoke-like extremity 120a which engages a pivotal actuating member 130 of the rotatably mounted shaft 132 carrying detent vanes 102 and 104. Lever 126 has a yoke-like extremity 126a which engages a pivotal actuating member 134 of the rotatably mounted shaft 136 carrying detent blade 106. Movement of bar 116 occurs to the left when actuated by bell crank 112 and to the right under the bias of springs 122 and 128. The linear direction and limits of movement of the bar are controlled by the slots 138 and 140 and the fixed screws 142 and 144. A removable cover or shield 146, shown with parts broken away, is employed for protecting the mechanism.

To process the components of the composite assembly, the envelope is grasped adjacent area 78 so that the envelope and underlying portions of sheet 76 are held firmly. The entire assembly is then drawn, preferably at an even speed, between the compression rollers 26 and 28 until clip 86 comes in contact with the rollers. Roller 26 is then moved away from roller 28 by means of lever 96, as described above. This permits unobstructed passage of the clip and the assembly is then withdrawn completely from the adapter apparatus. During the course of the aforesaid processing movement of the assembly, fluid container 84, enclosing the liquid reagent, is caused to rupture or separate along its releasably-sealed edges 84a under mechanical stress applied by the pressure rollers, thus releasing the liquid reagent to the image areas. The liquid reagent is spread in the form of a layer of given thickness between the contiguous facing areas of the photosensitive sheet 82 and the print-carrying sheet 74 which are bounded by marginal areas 76a and 76b. Longitudinal marginal areas 76a of the masking sheet, in addition to defining the picture area, also serve a spacing function to provide a given separation between pressure rollers 26 and 28 during the fluid spreading operation and thus, to a considerable extent, they determine the proper thickness and extent of coverage of the coating of the liquid reagent which is simultaneously spread across the facing areas of sheets 82 and 74. In order that a relatively thin masking sheet material may be employed while still serving a satisfactory spacing function relative to the rollers, as above described, roller 26 is provided with peripheral band areas 26b of slightly increased diameter relative to other portions. These bands operate in conjunction with masking sheet areas 76a to determine the correct spacing of the rollers for spreading the processing fluid between sheets 82 and 74. At the conclusion of the aforesaid spreading operation, the strips 88 and 90 are drawn between the pressure rollers 26 and 28 and roller 26 is caused to be separated from roller 28 by a slightly increased distance due to the increased effective thickness of the envelope provided by the strips. This construction permits an area or pocket extending transversely between platforms 88 and 90 which is relieved of compression to be utilized for confining or trapping any portion of the liquid reagent in excess of that required within the image areas, which may have been forced beyond the transverse limit of these areas.

After the assembly has been withdrawn from the adapter apparatus, it is preferably allowed to remain in an unaltered, assembled state for a given period as, for example, for approximately one minute, to complete the processing operation. The print-carrying sheet 74, the attached masking sheet 76 and the photosensitive sheet 82 are then withdrawn from envelope 70 as a single unit by means of clip 86, the print-carrying and photosensitive sheets being held or bonded together through the adhesive properties of the processing fluid. The print-carrying sheet is simultaneously stripped from the masking and photosensitive sheets, the completed positive image then appearing on the print-carrying sheet. The masking sheet provides a framed area around the area of the positive print which differs, for example, in density from the image area.

If it is desired to remove the composite assembly from the exposure chamber before its components have been processed as, for example, when it is desired to perform a rapid succession of photographic exposures of more than one assembly and to process the exposed assemblies later, the apparatus is also adapted to permit this type of operation. Assuming the photographic exposure to have been completed and envelope 70 to have been returned to the position shown in Fig. 2, as above described, the pressure rollers 26 and 28 will be at their noncompressive positions of widest separation and the detent vanes 102 and 104 and detent blade 106 will be at their functional engaging positions with respect to the assembly. It is only necessary to draw handle 116a, attached to bar 116, in a direction to the left, as viewed in Fig. 4, to release the aforesaid detent means from engagement with the assembly. The assembly can then easily be withdrawn from the adapter apparatus without being subjected to any compressive forces.

It is to be understood that the fluid container 84 could be attached to that surface of the masking sheet 76 which faces photosensitive sheet 82 instead of to the latter sheet, as shown, without materially affecting the processing operation. Other minor changes could be made in the constructions of the composite assembly without altering its operability to any appreciable extent as, for example, the print-carrying sheet 74 could be releasably attached directly to envelope 70 instead of through the intermediary of the masking sheet 76. In a further modification it would be possible to dispense with the masking sheet entirely and to employ other means for forming a frame around the image area of the positive print, such as through a pretreatment of the frame portions of the print-carrying sheet to render these portions unaffected by the processing fluid. If the masking sheet were eliminated, it will be apparent that means would have to be provided to supplant the spacing function served by longitudinal masking areas 76a. One alternative would, of course, be to increase the height of the spacing bands 26b of pressure roller 26.

It is conceivable that apparatus and materials of the invention could be employed with a camera other than a press camera and that they could be adapted to photographic methods and practices other than those described herein, or could readily be modified for such purposes. For example, other photographically photosensitive materials could be employed which are adapted to color photography or which are responsive to invisible radiation such as the ultraviolet, the infrared or forms of nuclear radiation.

The present application is a division of our copending application Serial No. 596,923, filed July 10, 1956.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Photographic apparatus for selectively photographically exposing and processing the alterable surfaces of a plurality of sheet-like components releasably contained with an individually releasably confined processing liquid in an envelope to provide both a latent negative image and a visible positive image of subject material of a photographic exposure, said photographic apparatus comprising means forming a chamber having an entrance port through which said envelope and its contained components may be inserted and withdrawn and having means providing an open area of given dimensions to admit actinic light of a photographic exposure to a photosensitive surface of one of said sheet-like components; first detent means positioned adjacent one end of said chamber for releasably engaging an end portion of said sheet-like component having said photosensitive surface when said envelope and its contained components are inserted into said chamber; second detent means positioned adjacent an opposite end of said chamber for releasably engaging a portion of said envelope to limit the withdrawal distance of said envelope to an extent which permits the photographic exposure of said photosensitive surface; said open area permitting photographic exposure of said photosensitive surface when said envelope is partially withdrawn to said limit of withdrawal distance; pressure-applying means located adjacent said entrance port for predeterminedly compressing said envelope and its contained components when withdrawn therebetween subsequent to said photographic exposure to apply given mechanical stress to confining means for said processing fluid located within said envelope adjacent said photosensitive surface, thereby releasing and spreading said fluid between said photosensitive surface and another surface of said sheet material components which is adapted to carry a positive visible image of the subject material of said latent neagtive image; positioning means actuable for alternatively bringing said pressure-applying means to compressive and non-compressive functional positions with respect to said envelope and its contained components; and means for releasing said first and second detent means to allow withdrawal from said chamber of said plurality of sheet-like components and said envelope in either position of said pressure-applying means.

2. Photographic apparatus for selectively photographically exposing and processing the alterable surfaces of a plurality of sheet-like components releasably contained with an individually releasably confined processing liquid in an envelope to provide both a latent negative image and a visible positive image of subject material of a photographic exposure, said photographic apparatus comprising means forming a chamber having an entrance port through which said envelope and its contained components may be inserted and withdrawn and having means providing an open area of given dimensions to admit actinic light of a photographic exposure to a photosensitive surface of one of said sheet-like components; first detent means positioned adjacent one end of said chamber for releasably engaging an end portion of said sheet-like component having said photosensitive surface when said envelope and its contained components are inserted into said chamber; second detent means positioned adjacent an opposite end of said chamber for releasably engaging a portion of said envelope to limit the withdrawal distance of said envelope to an extent which permits the photographic exposure of said photosensitive surface; said open area permitting photographic exposure of said photosensitive surface when said envelope is partially withdrawn to said limit of withdrawal distance; pressure-applying means located adjacent said entrance port for predeterminedly compressing said envelope and its contained components when withdrawn therebetween subsequent to said photographic exposure to apply given mechanical stress to confining means for said processing fluid located within said envelope adjacent said photosensitive surface, thereby releasing and spreading said fluid between said photosensitive surface and another surface of said sheet material components which is adapted to carry a positive visible image of the subject material of said latent negative image; positioning means actuable for alternatively bringing said pressure-applying means to compressive and non-compressive functional positions with respect to said envelope and its contained components; and means for releasing said first and second detent means to allow withdrawal from said chamber of said plurality of sheet-like components and said envelope when said pressure-applying means is in said compressive position.

3. Photographic apparatus for selectively photographically exposing and processing the alterable surfaces of a plurality of sheet-like components releasably contained with an individually releasably confined processing liquid in an envelope to provide both a latent negative image and a visible positive image of subject material of a photographic exposure, said photographic apparatus comprising means forming a chamber having an entrance port through which said envelope and its contained components may be inserted and withdrawn and having means providing an open area of given dimensions to admit actinic light of a photographic exposure to a photosensitive surface of one of said sheet-like components; first detent means positioned adjacent one end of said chamber for releasably engaging an end portion of said sheet-like component having said photosensitive surface when said envelope and its contained components are inserted into said chamber; second detent means positioned adjacent an opposite end of said chamber for releasably engaging a portion of said envelope to limit the withdrawal distance of said envelope to an extent which permits the photographic exposure of said photosensitive surface; said open area permitting photographic exposure of said photosensitive surface when said envelope is partially withdrawn to said limit of withdrawal distance; pressure-applying means located adjacent said entrance port for predeterminedly compressing said envelope and its contained components when withdrawn therebetween subsequent to said photographic exposure to apply given mechanical stress to confining means for said processing fluid located within said envelope adjacent said photosensitive surface, thereby releasing and spreading said fluid between said photosensitive surface and another surface of said sheet material components which is adapted to carry a positive visible image of the subject material of said latent negative image; positioning means actuable for alternatively bringing said pressure-applying means to compressive and non-compressive functional positions with respect to said envelope and its contained components; and means for releasing said first and second detent means to allow withdrawal from said chamber of said plurality of sheet-like components and said envelope when said pressure-applying means is in said compressive position, said detent releasing means being coupled to said positioning means and functioning to release said detents when said positioning means is actuated to bring said pressure-applying members to said compressive position.

4. Photographic apparatus for selectively photographically exposing and processing the alterable surfaces of a plurality of sheet-like components releasably contained with an individually releasably confined processing liquid in an envelope to provide both a latent negative image and a visible positive image of subject material of a photographic exposure, said photographic apparatus comprising means forming a chamber having an entrance port through which said envelope and its contained components may be inserted and withdrawn and having means providing an open area of given dimensions to admit actinic light of a photographic exposure to a photosensitive surface of one of said sheet-like components; first detent means positioned adjacent one end of said chamber for releasably engaging an end portion of said sheet-like component having said photosensitive surface when said envelope and its contained components are inserted into said chamber; second detent means positioned adjacent an opposite end of said chamber for releasably engaging a portion of said envelope to limit the withdrawal distance of said envelope to an extent which permits the photographic exposure of said photosensitive surface; said open area permiting photographic exposure of said photosensitive surface when said envelope is partially withdrawn to said limit of withdrawal distance; pressure-applying means located adjacent said entrance port for predeterminedly compressing said envelope and its contained components when withdrawn therebetween subsequent to said photographic exposure to apply given mechanical stress to confining means for said processing fluid located within said envelope adjacent said photosensitive surface, thereby releasing and spreading said fluid between said photosensitive surface and another surface of said sheet material components which is adapted to carry a positive visible image of the subject material of said latent negative image; positioning means actuable for alternatively bringing said pressure-applying means to compressive and non-compressive functional positions with respect to said envelope and its contained components; first means for releasing said first and second detent means to allow withdrawal from said chamber of said plurality of sheet-like components and said envelope when said pressure-applying means is in said compressive position, said first releasing means being coupled to said positioning means and functioning to release said detents when said positioning means is actuated to bring said pressure-applying members to said compressive position; and second means for releasing said first and second detent means actuable independently of said first releasing means to allow withdrawal from said chamber of said plurality of sheet-like components and said envelope when said pressure-applying means is in said non-compressive position.

5. Photographic apparatus for selectively photographically exposing and processing the alterable surfaces of a plurality of sheet-like components releasably contained with an individually releasably confined processing liquid in an envelope to provide both a latent negative image and a visible positive image of subject material of a photographic exposure, said photographic apparatus comprising means forming a chamber having an entrance port through which said envelope and its contained components may be inserted and withdrawn and having means providing an open area of given dimensions to admit actinic light of a photographic exposure to a photosensitive surface of one of said sheet-like components; first detent means positioned adjacent one end of said chamber for releasably engaging an end portion of said sheet-like component having said photosensitive surface when said envelope and its contained components are inserted into said chamber; second detent means positioned adjacent an opposite end of said chamber for releasably engaging a portion of said envelope to limit the withdrawal distance of said envelope to an extent which permits the photographic exposure of said photosensitive surface; said open area permiting photographic exposure of said photosensitive surface when said envelope is partially withdrawn to said limit of withdrawal distance; pressure-applying means located adjacent said entrance port for predeterminedly compressing said envelope and its contained components when withdrawn therebetween subsequent to said photographic exposure to apply given mechanical stress to confining means for said processing fluid located within said envelope adjacent said photosensitive surface, thereby releasing and spreading said fluid between said photosensitive surface and another surface of said sheet material components which is adapted to carry a positive visible image of the subject material of said latent negative image; positioning means actuable for alternatively bringing said pressure-applying means to compressive and non-compressive functional positions with respect to said envelope and its contained components; and means interlocking with said positioning means to provide movement of said first and second detent means to positions for engagement with said portions of said sheet-like component and said envelope, respectively, when said photosensitive surface is to be photographically exposed, and, accordingly, when said pressure-applying means is at said non-compressive position, said interlocking means alternatively providing movement of said first and second detent means to a position for nonengagement with said portions of said sheet-like component and said envelope, respectively, when said pressure-applying means is brought to said compressive position.

6. Photographic apparatus for selectively photographically exposing and processing the alterable surfaces of a plurality of sheet-like components releasably contained with an individually releasably confined processing liquid in an envelope to provide both a latent negative image and a visible positive image of subject material of a photographic exposure, said photographic apparatus comprising means forming a chamber having an entrance port through which said envelope and its contained components may be inserted and withdrawn and having means providing an open area of given dimensions to admit actinic light of a photographic exposure to a photosensitive surface of one of said sheet-like components; first detent means positioned adjacent one end of said chamber for releasably engaging an end portion of said sheet-like component having said photosensitive surface when said envelope and its contained components are inserted into said chamber; second detent means positioned adjacent an opposite end of said chamber for releasably engaging a portion of said envelope to limit the withdrawal distance of said envelope to an extent which permits the photographic exposure of said photosensitive surface; said open area permitting photographic exposure of said photosensitive surface when said envelope is partially withdrawn to said limit of withdrawal distance; pressure-applying means located adjacent said entrance port for predeterminedly compressing said envelope and its contained components when withdrawn therebetween subsequent to said photographic exposure to apply given mechanical stress to confining means for said processing fluid located within said envelope adjacent said photosensitive surface, thereby releasing and spreading said fluid between said photosensitive surface and another surface of said sheet material components which is adapted to carry a positive visible image of the subject material of said latent negative image; positioning means actuable for alternatively bringing said pressure-applying means to compressive and non-compressive functional positions with respect to said envelope and its contained components; means interlocking with said positioning means to provide movement of said first and second detent means to positions for engagement with said portions of said sheet-like component and said envelope, respectively, when said photosensitive surface is to be photographically exposed, and, accordingly, when said pressure-applying means is at said non-compressive position, said interlocking means alternatively providing movement of said first and second detent means to a position for nonengagement with said portions of said sheet-like component and said envelope, respectively, when said pressure-applying means is brought to said compressive position, and means operable independently of said interlocking means for providing movement of said first and second detent means to a position for nonengagement with said portions of said sheet-like component and said envelope, respectively, when said pressure-applying means is at said non-compressive position.

7. Photographic apparatus for selectively photographically exposing and processing the alterable surfaces of a plurality of sheet-like components releasably contained with an individually releasably confined processing liquid in an envelope to provide both a latent negative image and a visible positive image of subject material of a photographic exposure, said photographic apparatus comprising means forming a chamber having an entrance port through which said envelope and its contained components may be inserted and withdrawn and having means providing an open area of given dimensions to admit actinic light of a photographic exposure to a photosensitive surface of one of said sheet-like components; first blade-like detent means positioned adjacent one end of said chamber for releasably engaging an end portion of said sheet-like component having said photosensitive surface when said envelope and its contained components are inserted into said chamber; second vane-like detent means positioned adjacent an opposite end of said chamber for releasably engaging a portion of said envelope to limit the withdrawal distance of said envelope to an extent which permits the photographic exposure of said photosensitive surface; said open area permitting photographic exposure of said photosensitive surface when said envelope is partially withdrawn to said limit of withdrawal distance; pressure-applying means located adjacent said entrance port for predeterminedly compressing said envelope and its contained components when withdrawn therebetween subsequent to said photographic exposure to apply given mechanical stress to confining means for said processing fluid located within said envelope adjacent said photosensitive surface, thereby releasing and spreading said fluid between said photosensitive surface and another surface of said sheet material components which is adapted to carry a positive visible image of the subject material of said latent negative image; positioning means actuable for alternatively bringing said pressure-applying means to compressive and non-compressive functional positions with respect to said envelope and its contained components; and means for releasing said first blade-like detent means and said second vane-like detent means to allow withdrawal from said chamber of said plurality of sheet-like components and said envelope in either position of said pressure-applying means.

8. Photographic apparatus for selectively photographically exposing and processing the alterable surfaces of a plurality of sheet-like components releasably contained with an individually releasably confined processing liquid in an envelope to provide both a latent negative image and a visible positive image of subject material of a photographic exposure, said photographic apparatus comprising means forming a chamber comprising, respectively, an entrance port, guide means for slidably inserting and withdrawing said envelope with respect to said entrance port, means providing a plate-like surface for supporting said envelope, and framing means attached to and extending in partially overlying spaced relation to said plate-like surface providing an open rectangular framed area of given dimensions to admit actinic light of a photographic exposure to a photosensitive surface of one of said sheet-like components, blade-like detent means positioned adjacent one end of said chamber for releasably engaging an end portion of said sheet-like component having said photosensitive surface, vane-like detent means positioned adjacent an opposite end of said chamber for releasably engaging an end portion of said envelope to limit the withdrawal distance of said envelope to an extent which permits the photographic exposure of said photosensitive surface, said framing means cooperating with said plate-like surface to fix said photosensitive surface at a position for its photographic exposure upon partial withdrawal of said envelope, spring-biased pressure-applying means located adjacent said entrance port of said chamber for predeterminedly compressing said envelope and its contained components when withdrawn therebetween subsequent to said photographic exposure to apply given mechanical stress to confining means for said processing fluid located within said envelope adjacent said photosensitive surface, thereby releasing and spreading said fluid between said photosensitive surface and another surface of said sheet material components which is adapted to carry a positive visible image of the subject material of said latent negative image, positioning means for alternatively bringing said pressure-applying means to compressive and noncompressive functional positions with respect to said envelope and its contained components, means interlocking with said positioning means to provide movement of said blade-like and vane-like detent means to positions for engagement with said portions of said sheet-like component and said envelope, respectively, when said photosensitive surface is to be photographically exposed and, accordingly, when said pressure-applying means is at said noncompressive position, said interlocking means alternatively providing movement of said detent means to a position for nonengagement with said portions of said sheet-like component and said envelope when said pressure-applying means is brought to said compressive position, and means operable substantially independently of said interlocking means for releasing said detent means from engagement with said portions of said sheet-like component and said envelope when said pressure-applying means is at said noncompressive position.

9. Photographic apparatus for selectively photographically exposing and processing the alterable surfaces of a plurality of sheet-like components releasably contained with an individually releasably confined processing liquid in an envelope to provide both a latent negative image and a visible positive image of subject material of a photographic exposure, said photographic apparatus comprising means forming a chamber comprising, respectively, an entrance port, guide means for slidably inserting and withdrawing said envelope with respect to said entrance port, means providing a plate-like surface for supporting said envelope, and framing means attached to and extending in partially overlying spaced relation to said plate-like surface providing an open rectangular framed area of given dimensions to admit actinic light of a photographic exposure to a photosensitive surface of one of said sheet-like components, blade-like detent means positioned adjacent one end of said chamber for releasably engaging an end portion of said sheet-like component having said photosensitive surface, vane-like detent means positioned adjacent an opposite end of said chamber for releasably engaging an end portion of said envelope to limit the withdrawal distance of said envelope to an extent which permits the photographic exposure of said photosensitive surface, said framing means cooperating with said plate-like surface to fix said photosensitive surface at a plane for its photographic exposure upon partial withdrawal of said envelope, a pair of pressure members, one of which is predeterminedly spring-biased for bodily movement toward the other, located adjacent said entrance port of said chamber for predeterminedly compressing said envelope and its contained components when withdrawn therebetween subsequent to said photographic exposure, said pressure members being adapted to apply given mechanical stress to confining means for said processing fluid located within said envelope adjacent said photosensitive surface, thereby releasing and spreading said fluid between said photosensitive surface and another surface of said sheet material components which is adapted to carry a positive visible image of the subject material of said latent negative image, positioning means for alternatively bringing said spring-biased pressure member to compressive and noncompressive functional positions with respect to said envelope and its contained components, means interlocking with said positioning means to provide movement of said blade-like and vane-like detent means to positions for engagement with said portions of said sheet-like component and said envelope, respectively, when said photosensitive surface is to be photographically exposed and, accordingly, when said spring-biased pressure member is at said noncompressive position, said interlocking means alternatively providing movement of said detent means to a position for nonengagement with said portions of said sheet-like component and said envelope when said spring-biased pressure member is brought to said compressive position, and means operable substantially independently of said interlocking means for releasing said detent means from engagement with said portions of said sheet-like component and said envelope when said spring-biased pressure member is at said noncompressive position.

10. Photographic apparatus for selectively photographically exposing and processing the alterable surfaces of a plurality of sheet-like components releasably contained with an individually releasably confined processing liquid in an envelope to provide both a latent negative image and a visible positive image of subject material of a photographic exposure, said photographic apparatus comprising means forming a chamber comprising, respectively, an entrance port, guide means for slidably inserting and withdrawing said envelope with respect to said entrance port, means providing a plate-like surface for supporting said envelope, and framing means attached to and extending in partially overlying spaced relation to said plate-like surface providing an open rectangular framed area of given dimensions to admit actinic light of a photographic exposure to a photosensitive surface of one of said sheet-like components, blade-like detent means positioned adjacent one end of said chamber for releasably engaging an end portion of said sheet-like component having said photosensitive surface, vane-like detent means positioned adjacent an opposite end of said chamber for releasably engaging an end portion of said envelope to limit the withdrawal distance of said envelope to an extent which permits the photographic exposure of said photosensitive surface, said framing means cooperating with said plate-like surface to fix said photosensitive surface at a plane for its photographic exposure upon partial withdrawal of said envelope, a pair of pressure rollers, one of which is predeterminedly spring-biased for bodily movement toward the other, located adjacent said entrance port of said chamber for predeterminedly compressing said envelope and its contained components when withdrawn therebetween subsequent to said photographic exposure, said pressure rollers being adapted to apply given mechanical stress to confining means for said processing fluid located within said envelope adjacent said photosensitive surface, thereby releasing and spreading said fluid between said photosensitive surface and another surface of said sheet material components which is adapted to carry a positive visible image of the subject material of said latent negative image, positioning means for alternatively bringing said spring-biased pressure roller to compressive and noncompressive functional positions with respect to said envelope and its contained components, means interlocking with said positioning means to provide movement of said blade-like and vane-like detent means to positions for engagement with said portions of said sheet-like component and said envelope, respectively, when said photosensitive surface is to be photographically exposed and, accordingly, when said spring-biased roller is at said noncompressive position, said interlocking means alternatively providing movement of said detent means to a position for nonengagement with said portions of said sheet-like component and said envelope when said spring-biased pressure roller is brought to said compressive position, and means operable substantially independently of said interlocking means for releasing said detent means from engagement with said portions of said sheet-like component and said envelope when said spring-biased pressure roller is at said noncompressive position, said spring-biased pressure roller extending across the transverse dimension of said envelope and having portions adjacent its extremities which differ in diameter from central portions thereof so as to be capable of applying differential compression to different transverse areas of said envelope and its contained components.

11. Photographic apparatus for selectively photographically exposing and processing the alterable surfaces of a plurality of sheet-like components releasably contained with an individually releasably confined processing liquid in an envelope which normally shields said surfaces from actinic light to provide both a latent negative image and a visible positive image of subject material of a photographic exposure, said photographic apparatus comprising means forming a chamber comprising, respectively, an entrance port, guide means for slidably inserting and withdrawing said envelope with respect to said entrance port, means providing a plate-like surface for supporting said envelope, and framing means attached to and extending in partially overlying spaced relation to said plate-like surface providing an open rectangular framed area of given dimensions to admit actinic light of a photographic exposure to a photosensitive surface of one of said sheet-like components, blade-like detent means positioned adjacent one end of said chamber for releasably engaging an end member of said sheet-like component having said photosensitive surface, vane-like detent means positioned adjacent an opposite end of said chamber for releasably engaging retaining means of said envelope to limit the withdrawal distance of said envelope which permits the photographic exposure of said photosensitive surface, said framing means cooperating with said plate-like surface to fix said photosensitive surface at a plane for its photographic exposure upon partial withdrawal of said envelope, a pair of pressure rollers, one of which is predeterminedly biased for bodily movement toward the other, located adjacent said entrance port of said chamber for predeterminedly compressing said envelope and its contained components when withdrawn therebetween subsequent to said photographic exposure, said pressure rollers being adapted to apply given mechanical stress to confining means releasably holding said processing fluid to release and spread said fluid between said surface and another surface of said sheet-like components which is adapted to carry a positive visible image of the subject material of said latent negative image, positioning means for alternatively bringing said biased pressure roller to compressive and noncompressive functional positions with respect to said envelope and its contained components, means interlocking with said positioning means to provide movement of said blade-like and vane-like detent means to a position for engagement with said end member of said sheet material component and said retaining means of said envelope, respectively, when said photosensitive surface is to be photographically exposed and accordingly when said biased pressure roller is at said noncompressive position, said interlocking means alternatively providing movement of said detent means to a position for nonengagement with said end member and retaining means when said biased pressure roller is brought to said compressive position, means operable substantially independently of said interlocking means for releasing said detent means for engagement with said end member and retaining means when said biased pressure roller is at said noncompressive position, housing means having a slot for insertion and withdrawal of said envelope substantially enclosing said pressure rollers and said entrance port of said chamber, said housing means being pivotally attached to an extension of said plate-like surface, and latching means for holding said housing means at closed position.

12. Photographic apparatus for selectively photographically exposing and processing the alterable surfaces of a plurality of sheet-like components releasably contained with an individually releasably confined processing liquid in an envelope to provide both a latent negative image and a visible positive image of subject material of a photographic exposure, said photographic apparatus comprising means forming a chamber comprising, respectively, an entrance port, guide means for slidably inserting and withdrawing said envelope with respect to said entrance port, means providing a plate-like surface for supporting said envelope, and framing means attached to and extending in partially overlying spaced relation to said plate-like surface providing an open rectangular framed area of given dimensions to admit actinic light of a photographic exposure to a photosensitive surface of one of said sheet-like components, blade-like detent means positioned adjacent one end of said chamber for releasably engaging an end portion of said sheet-like component having said photosensitive surface, vane-like detent means positioned adjacent an opposite end of said chamber for releasably engaging an end portion of said envelope to limit the withdrawal distance of said envelope to an extent which permits the photographic exposure of said photosensitive surface, said framing means cooperating with said plate-like surface to fix said photosensitive surface at a position for its photographic exposure upon partial withdrawal of said envelope, a pair of pressure members, one of which is predeterminedly spring-biased for bodily movement toward the other, located adjacent said entrance port of said chamber for predeterminedly compressing said envelope and its contained components when withdrawn therebetween subsequent to said photographic exposure, said pressure members being adapted to apply given mechanical stress to confining means for said processing fluid located within said envelope adjacent said photosensitive surface, thereby releasing and spreading said fluid between said photosensitive surface and another surface of said sheet material components which is adapted to carry a positive visible image of the subject material of said latent negative image, lever means alternatively operable in directions conforming with and opposed to the bias applied to said spring-biased pressure member for alternatively bringing said spring biased pressure member to compressive and noncompressive functional positions with respect to said envelope and its contained components, link means eccentrically connected at one end with said lever means so as to be actuated for reciprocating movement thereby, a bell-crank having an arm pivotally attached to said link and an arm in contact with contacting means of a slidable bar, means restricting said bar to a given linear movement, pivotal means operatively connected with said blade-like and vane-like detent means, said pivotal means being actuated in a given direction by said lever, said link and said bell-crank means and in an opposite direction by spring means, and handle means connected to said bar for moving said pivotal means in said first-named direction substantially independently of said lever, said link and said bell-crank means, whereby, when said lever means places said spring-biased pressure member at a compressive functional position said pivotal means withdraws said detent means from contact with said portions of said sheet material component and said envelope thus permitting substantially unimpeded movement thereof, and when said lever means places said spring-biased pressure member at a noncompressive functional position said pivotal means places said detent means at a location for contact with said portions of said sheet-like component and said envelope to position them for a photographic exposure, said handle means permitting withdrawal of said detent means from contact with said portions when said spring-biased pressure member is at a noncompressive position.

No references cited.